(12) United States Patent
Shapiro

(10) Patent No.: US 9,659,180 B2
(45) Date of Patent: May 23, 2017

(54) PERSONALIZED WEBSITE THEME

(75) Inventor: William Shapiro, Mountain View, CA (US)

(73) Assignee: Adobe Systems Incorporation, San Jose, CA (US)

( * ) Notice: Subject to any disclaimer, the term of this patent is extended or adjusted under 35 U.S.C. 154(b) by 1302 days.

(21) Appl. No.: 13/253,010

(22) Filed: Oct. 4, 2011

(65) Prior Publication Data
US 2013/0132857 A1   May 23, 2013

(51) Int. Cl.
*G06F 3/14* (2006.01)
*G06F 21/62* (2013.01)
*H04L 29/06* (2006.01)
*G06F 21/64* (2013.01)

(52) U.S. Cl.
CPC .......... *G06F 21/6209* (2013.01); *G06F 21/64* (2013.01); *H04L 63/1483* (2013.01); *G06F 2221/2119* (2013.01)

(58) Field of Classification Search
CPC .................................... G06F 3/14; G06F 3/17
USPC ........ 715/200–277, 700–867; 700/701–866; 709/201–229; 705/14.17, 50–77; 345/30–111; 707/768; 434/236; 726/1, 726/28
See application file for complete search history.

(56) References Cited

U.S. PATENT DOCUMENTS

| | | | |
|---|---|---|---|
| 8,468,577 B1* | 6/2013 | Pooley et al. | 726/1 |
| 2007/0072156 A1* | 3/2007 | Kaufman et al. | 434/236 |
| 2010/0082660 A1* | 4/2010 | Muilenburg et al. | 707/768 |
| 2012/0136704 A1* | 5/2012 | Carlson et al. | 705/14.17 |
| 2012/0216297 A1* | 8/2012 | Cohen et al. | 726/28 |
| 2013/0238979 A1* | 9/2013 | Sayers et al. | 715/234 |

* cited by examiner

*Primary Examiner* — Ruay Ho
(74) *Attorney, Agent, or Firm* — Wolfe-SBMC

(57) ABSTRACT

A personalized website theme for a website is received. The personalized website theme is distinct from a standard theme of the website. Further, a set of data is sent to the computing device. The set of data includes an indicium indicating the personalized website theme so that the computing device displays the website according to the personalized website theme at least prior to a request for identifying data associated with access to an account on the website.

19 Claims, 16 Drawing Sheets

PERSONALIZED WEBSITE THEME

BACKGROUND

1. Field

This disclosure generally relates to websites. More particularly, the disclosure relates to website personalization.

2. General Background

A webserver typically provides a standardized webpage to users that visit a corresponding website. In other words, whether a first user or a second user visits a website, both users typically view the same standardized website. A phishing attack is generally a scheme that is utilized to improperly obtain personal information of a user at such a standardized website. Phishing attacks typically involve a fake email message or a fake website that looks the same as what the user would receive or view from a legitimate organization with which the user has a legitimate relationship with, e.g., a bank. Further, standardized websites do not invoke interest on the part of users as they feel that they view the same website in the same manner as everyone else visiting that website.

SUMMARY

In one aspect of the disclosure, a computer program product is provided. The computer program product includes a computer useable medium having a computer readable program. The computer readable program when executed on a computer causes the computer to receive, from a computing device, a personalized website theme for a website, the personalized website theme being distinct from a standard theme of the website. Further, the computer readable program when executed on the computer causes the computer to send a set of data to the computing device, the set of data including an indicium indicating the personalized website theme so that the computing device displays the website according to the personalized website theme at least prior to a request for identifying data associated with access to an account on the website.

In another aspect of the disclosure, a process is provided. The process receives, from a computing device, an indicium of a personalized website theme for a website. The personalized website theme is distinct from a standard theme of the website. Further, the process sends a set of data to the computing device so that the computing device utilizes a set of data to display the website according to the personalized website theme associated with the indicium at least prior to a request for identifying data associated with access to an account on the website.

In yet another aspect of the disclosure, a system is provided. The system includes a server that composes a set of data. Further, the system includes a transmission module that sends, from the server, the set of data to a computing device such that the computing device utilizes the set of data to generate a personalized theme and displays a website according to the personalized website theme at least prior to a request for identifying data associated with access to an account on the website.

In another aspect of the disclosure, a computer program product is provided. The computer program product includes a computer useable medium having a computer readable program. The computer readable program when executed on a computer causes the computer to establish, at a client, communication with a webserver. Further, the computer readable program when executed on the computer causes the computer to provide, from the client to the webserver, an indication that a personalized website theme for a website hosted by the webserver has been selected. In addition, the computer readable program when executed on the computer causes the computer to locate, with a set of data, the personalized website theme. The computer readable program when executed on the computer also causes the computer to display, at the client, the website according to the personalized website theme.

In yet another aspect of the disclosure, a process is provided. The process sends, from a client to a webserver, a request for a webpage of a website from the webserver. Further, the process locates, with the client, a personalized website theme by utilizing a set of data. In addition, the client displays, at the client, the website according to the personalized website theme.

In another aspect of the disclosure, a system is provided. The system includes a webserver that receives, from a client, a request for a webpage of a website from the webserver. Further, the system includes a processor that generates, at the webserver, a set of data. The system also includes a transmission module that sends, from the webserver to the client, the set of data so that the client locates a personalized website theme by utilizing the set of data and displays the website according to the personalized website theme.

BRIEF DESCRIPTION OF THE DRAWINGS

The above-mentioned features of the present disclosure will become more apparent with reference to the following description taken in conjunction with the accompanying drawings wherein like reference numerals denote like elements and in which:

FIG. 1A illustrates a personalized website theme configuration 100.

FIG. 1B illustrates an alternative configuration a user at the computing device 104 may provide his or her own theme, which is not part of at least the portion of the plurality of themes, to the web server 102.

FIG. 1C illustrates an alternative configuration in which the computing device 104 generates the personalized theme without involvement from the webserver 106.

FIG. 1D illustrates an alternative configuration that is a combination of the configuration illustrated in FIGS. 1A and 1B.

FIG. 2A illustrates the GUI displaying a request that the user select a personalized theme.

FIG. 2B illustrates the GUI displaying the selected personalized theme.

FIG. 3A illustrates the website personalized according to the theme selected by the user prior any entry of user data.

Further, FIG. 3B illustrates the website personalized according to the selected by the user after entering his or her login name in FIG. 3A, but prior to the entry of a password.

In addition, FIG. 3C illustrates the website providing a display of user data after access has been granted.

FIG. 4A illustrates a process that may be utilized to provide a personalized theme.

FIG. 4B illustrates another process that may be utilized to provide a personalized theme.

FIG. 4C illustrates yet another process that may be utilized to provide a personalized theme.

FIG. 4D illustrates another process that may be utilized to provide a personalized theme.

FIG. 4E illustrates yet another process that may be utilized to provide a personalized theme.

FIG. 4F illustrates another process that may be utilized to provide a personalized theme.

DETAILED DESCRIPTION

Figure 1A:
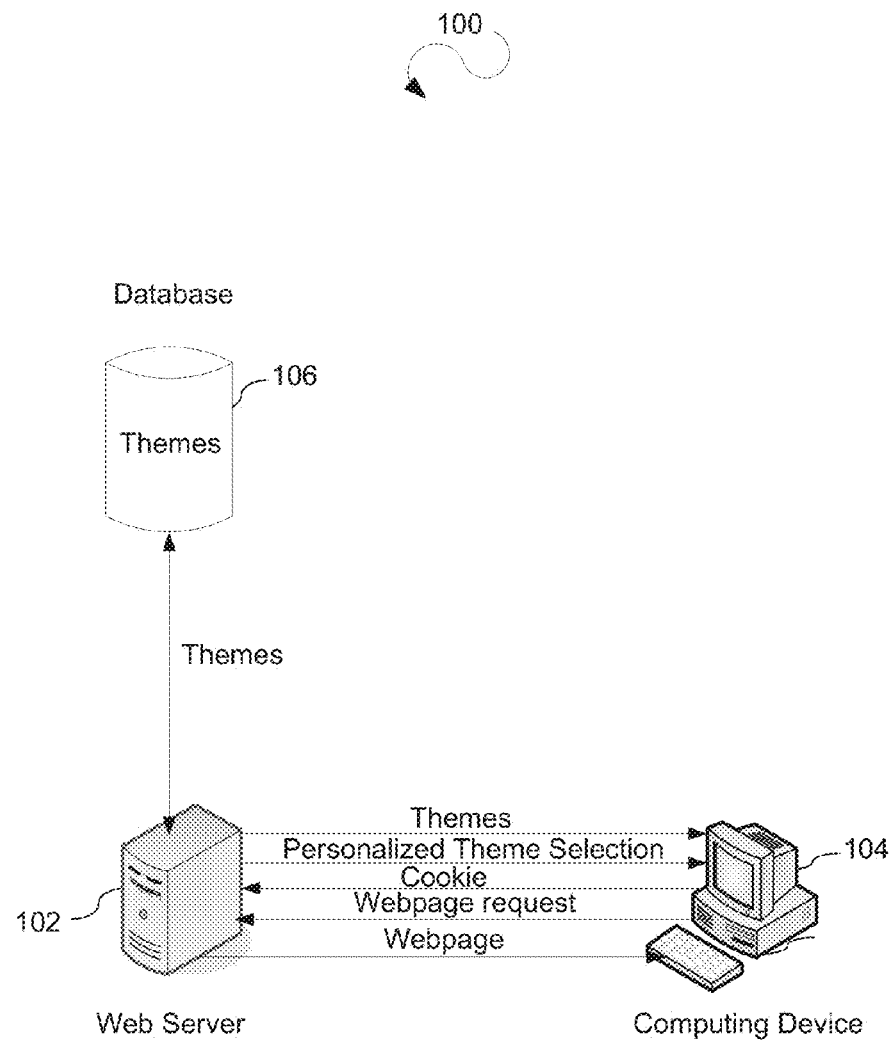
FIGS. 1A-1D illustrate various personalized website theme configurations.

A personalized website theme configuration for a website is provided. The personalized website theme configuration provides a personalized website theme for the website that is distinct from a standard theme of the website. As an example, a plurality of users typically type in a web address and view the same website that the mass public views prior to a login. In one embodiment, the personalized website theme configuration personalizes a website so that a user views the website according to his or her personalized theme rather than the standard theme of the website viewed by the mass public. For instance, the personalized theme may be a background image, a foreground image, a picture, a sound, a color scheme, a particular style in a cascading style sheet, a combination of any of the foregoing, or the like that the user recognizes as being his or her personalized theme. The personalized theme may also include a combination of an image and a sound. Further, the personalized themes of each individualized user may be stored on each individualized user's own computing device. As a result, the user may recognize that the website is a valid website prior to entering any information such as a login name and/or a password. Accordingly, when the user navigates to a website, the user's computing device may automatically replace the standard theme of the website with a personalized theme. The user then may view the website in a format that is most comfortable to the user.

Further, as an example, website theme personalization may be utilized to validate a website prior to the user providing any identifying information. Accordingly, when the user navigates to the website or follows a link such as from an e-mail, the user would view his or her customized theme if the website is valid. However, if the website is a phishing website, that website would not have access to the personalized theme of the user and, therefore, would likely display a distinct look and feel for the website, e.g., a standard theme. The user would then notice that the website does not look correct and reconsider typing in any personal information.

In one embodiment, a set of code is provided to the user's computing device. The set of code may include the details of the theme that has been chosen by the user. As examples, the set of code may be a cookie, a flash object such as a local shared object, HTML5 local storage, or the like. The user may be asked to select a theme from a plurality of predetermined themes. Alternatively, the user may be allowed to provide his or her own theme. As an example, a user may browser his or her computing device for a picture that he or she would like to utilize as a theme. In yet another alternative, a personalized theme may be selected for the user. For instance, a set of random generation code may be utilized to randomly select a personalized theme for the user.

The establishment of the personalized theme may occur at various times. For example, a user may be asked to establish a personalized them when signing onto a website for the first time. Further, a user may be asked to establish a personalized theme for a new service at a website that the user has previously utilized. A user may also be asked to establish a personalized theme when accessing the website from an unrecognized computing device, e.g., a different computing device than the computing device at which the user was located when originally establishing the personalized them.

FIGS. 1A-1D illustrate various personalized website theme configurations.

FIG. 1A illustrates a personalized website theme configuration 100. The personalized website theme configuration 100 includes a web server 102 that communicates with a computing device 104 and a database 106. The database 106 may include a plurality of predetermined themes. Accordingly, when the computing device 104 requests a webpage from the web server 102, the web server 102 may request that the computing device 104 establish a personalized theme for the user. The web server 102 may obtain at least a portion of the plurality of themes from the database 106. The web server 102 may then provide at least the portion of the plurality of themes to the computing device 104 so that the user may select a personalized theme. The computing device provides the personalized theme selection to the web server 102. Further, the web server 102 may then provide a set of code to the computing device 104 that generates the personalized theme for the website when the user accesses the website. As an example, the set of code may be a cookie.

Figure 1B:
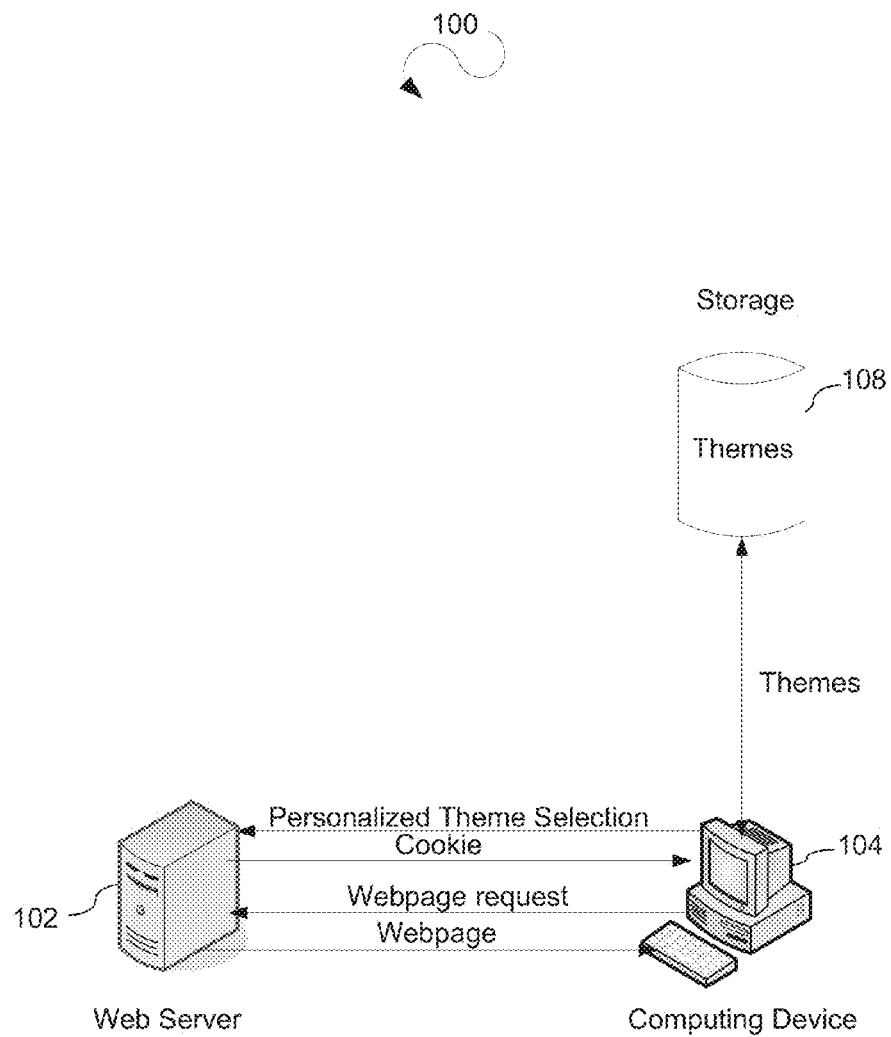

FIG. 1B illustrates an alternative configuration a user at the computing device 104 may provide his or her own theme, which is not part of at least the portion of the plurality of themes, to the web server 102. For example, the computing device 104 may be in operable communication with a storage device 108, which stores a plurality of themes. The storage device 108 may be a hard drive, flash drive, memory, or the like. In one embodiment, the computing device 104 provides the selected theme to the webserver 102, which generates a cookie and sends the cookie back to the computing device 104. The cookie allows the computing device 104 to automatically render a webpage received from the webserver 102 according to the personalized website theme upon receipt of the webpage. For example, the cookie may instruct the computing device 104 on how the computing device 104 should replace imagery in the standard webpage received from the webserver 106 with imagery from the personalized website theme.

Figure 1C:
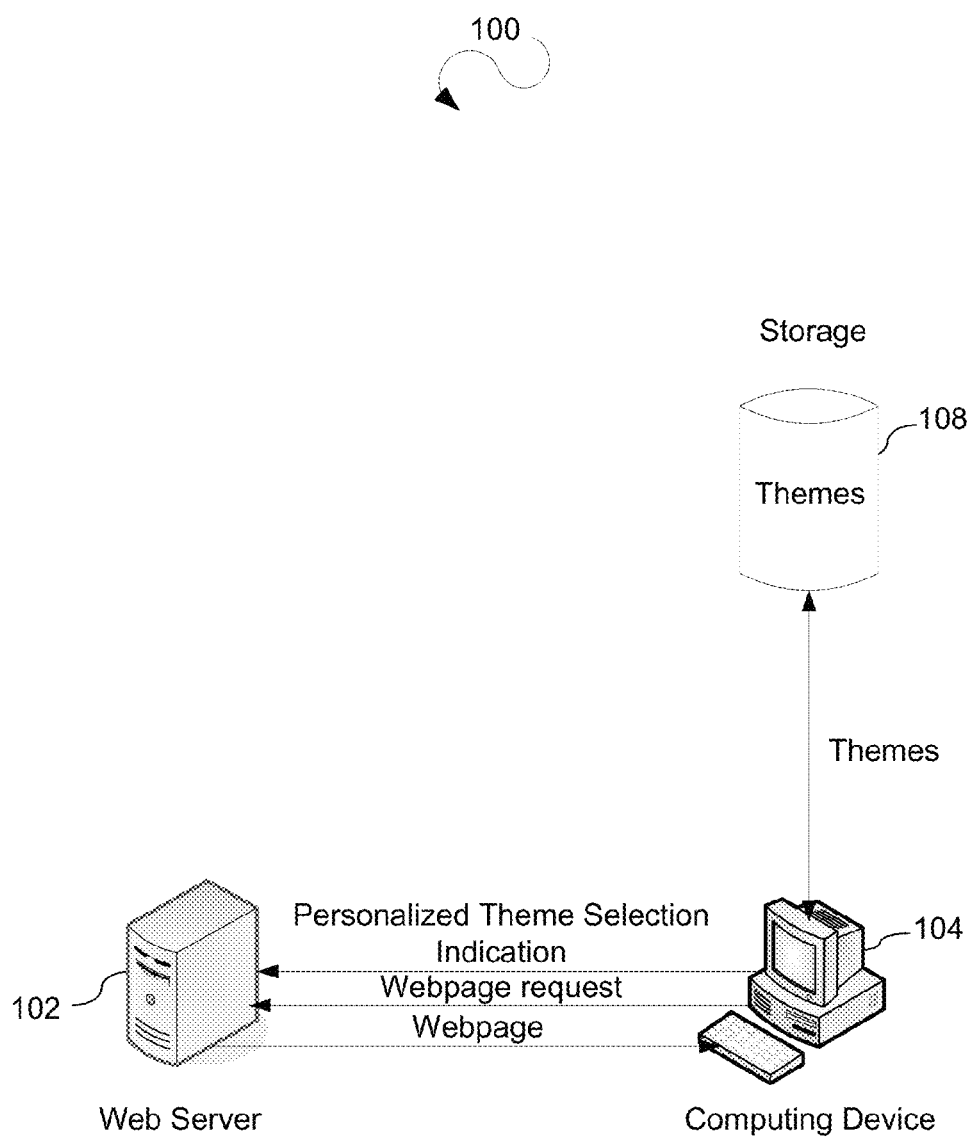

FIG. 1C illustrates an alternative configuration in which the computing device 104 generates the personalized theme without involvement from the webserver 106. In one embodiment, the computing device 104 may have or generate its own set of code to establish the personalized website theme. Accordingly, the computing device 104 makes a webpage request and receives a webpage. The computing device 104 then replaces the standard theme of the webpage with the personalized theme. In one embodiment, the computing device 104 establishes communication with the webserver 104 prior to requesting the webpage to indicate that a personalized website theme has been selected. The indication may or may not include the personalized website theme. For example, the indication may simply indicate that a website theme has been selected without providing the selected theme, or the indication may provide the selected theme. In an alternative embodiment, the computing device 104 and the webserver 102 do not communicate prior to the webpage request and a personalized theme selection indication is not provided from the computing device 104 to the webserver 102.

Figure 1D:
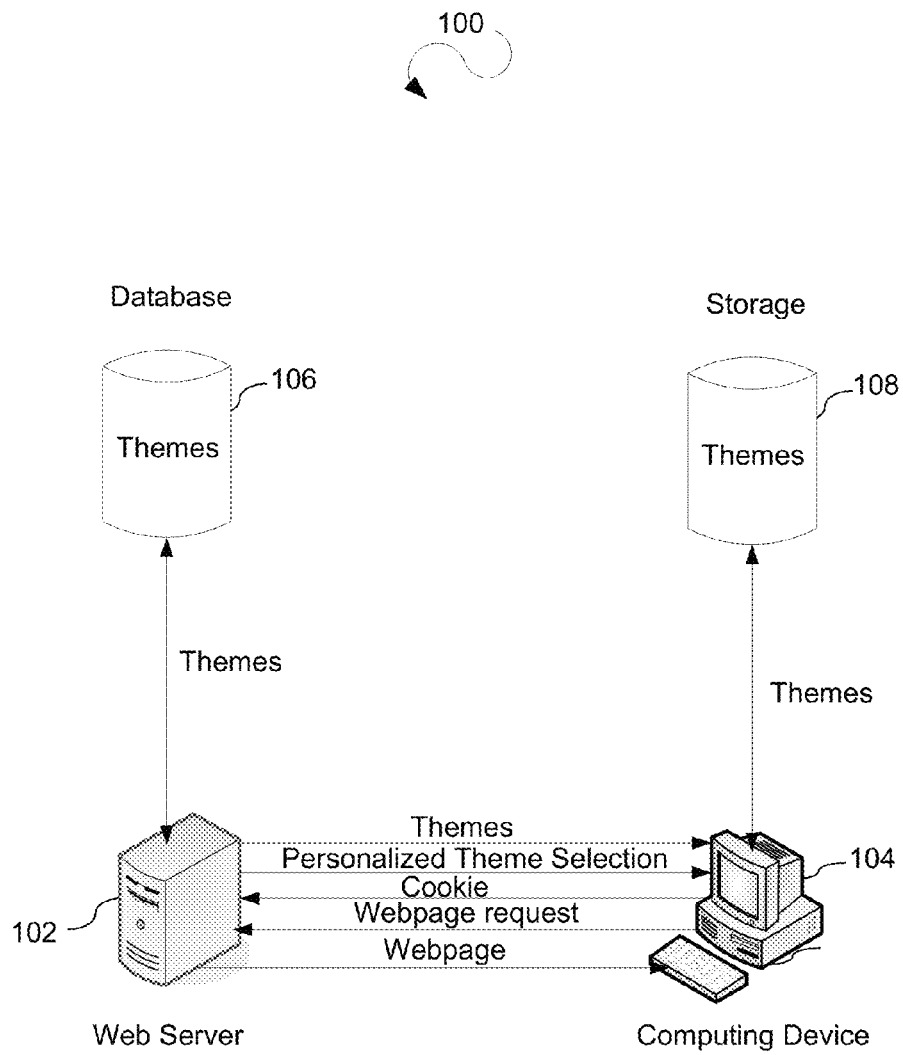

FIG. 1D illustrates an alternative configuration that is a combination of the configuration illustrated in FIGS. 1A and 1B. A user may be provided with an option of selecting a theme from the database 106 or the storage device 108. In other words, the user may be given the option of selecting from a predetermined plurality of themes or providing his or her own theme. A cookie may or may not be utilized with this configuration.

Figure 2A:
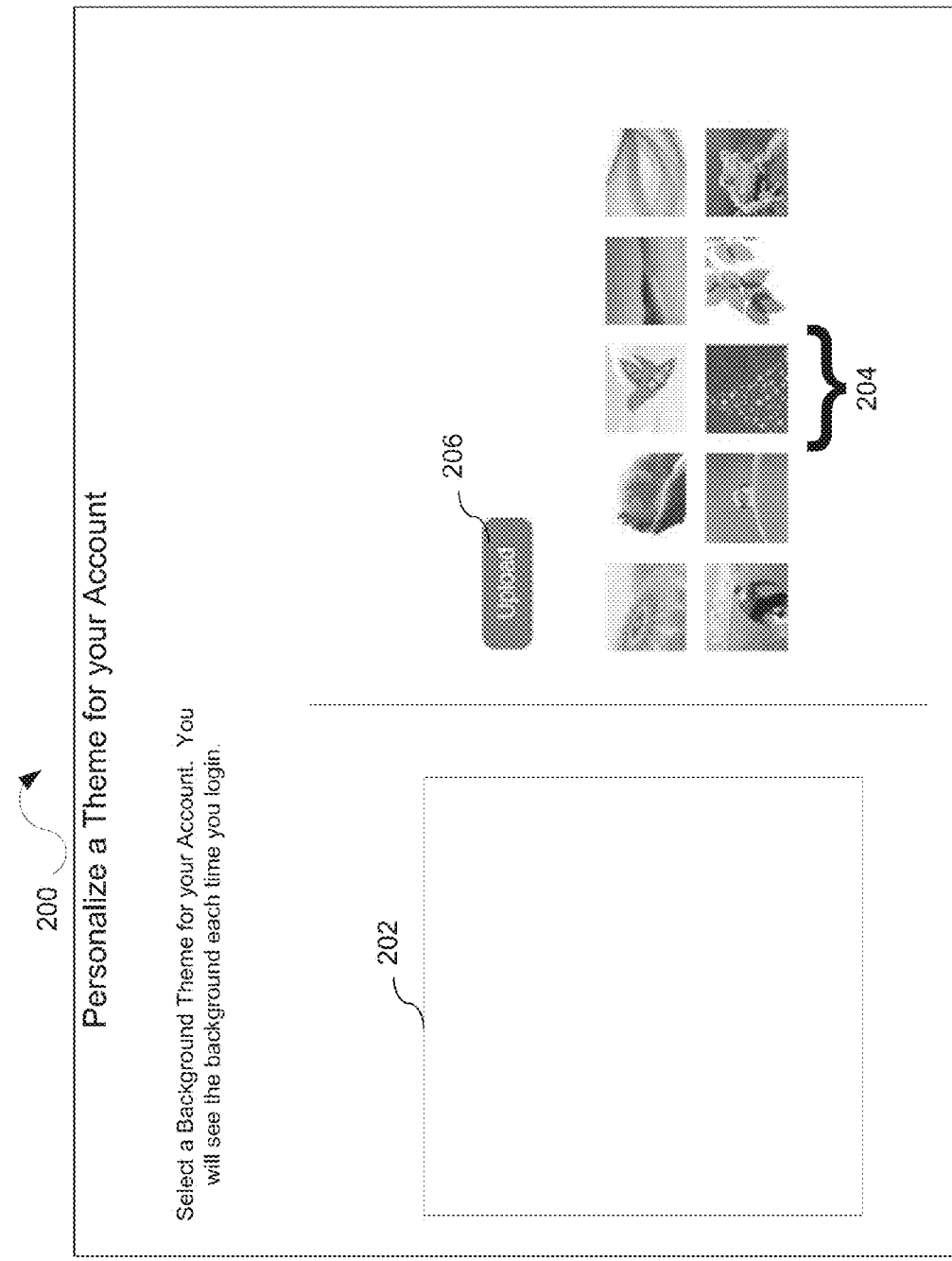
FIGS. 2A and 2B illustrate examples of a graphical user interface ("GUI") that is utilized to receive a personalized theme selection.
Figure 2B:
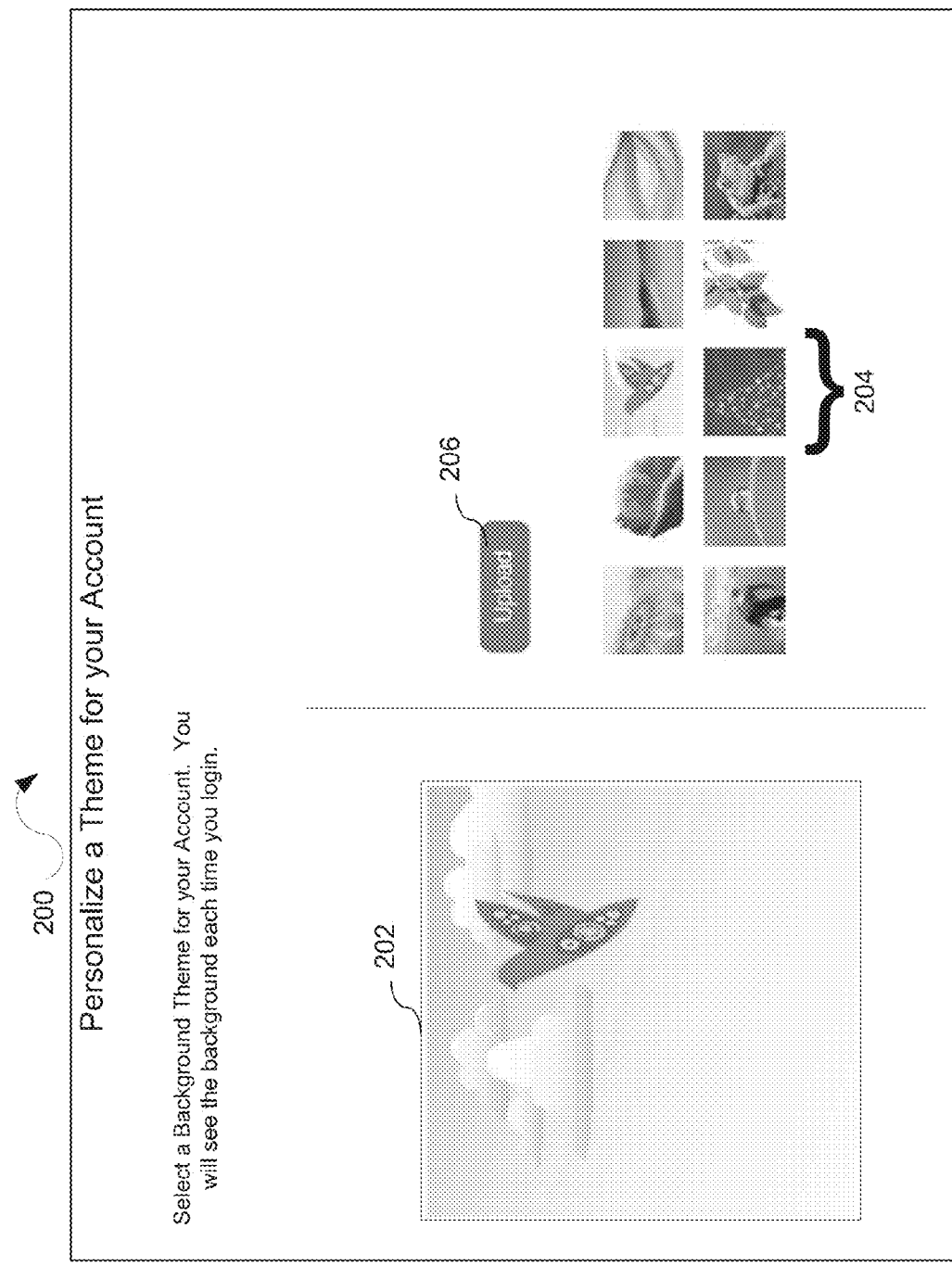

FIGS. 2A and 2B illustrate examples of a GUI 200 that is utilized to receive a personalized theme selection. FIG. 2A illustrates the GUI 200 displaying a request that the user select a personalized theme. The GUI includes a display window 202 that eventually displays the theme selected by the user. Initially, the display window may be empty, display imagery other than a theme, display instructions, display an initial image from a plurality of images 204, or the like. The user may select an image from the plurality of images 204. As illustrated in FIG. 1, the plurality of images 204 may be themes that are stored in the database 106. With respect to FIG. 2A, the user may upload the selected image by pressing an upload button 206. However, the user may provide an upload command in a variety of other manners such as typing an upload command, dragging and dropping the selected image to the display window 202, or the like. The upload command indicates that the computing device should provide the personalized theme to the web server 102 as illustrated in FIG. 1 so that the web server 102 may generate the set of code and send the set of code to the computing device 104. Alternatively, if the computing device is generating the set of code, a user selection may be performed without an upload command.

FIG. 2B illustrates the GUI 200 displaying the selected personalized theme. In one embodiment, the GUI 200 displays the selected personalized theme in the display window 202. In an alternative embodiment, the user may select a theme from the plurality of themes 204 without the selected personalized theme being displayed after selection in the GUI 200.

Figure 3A:
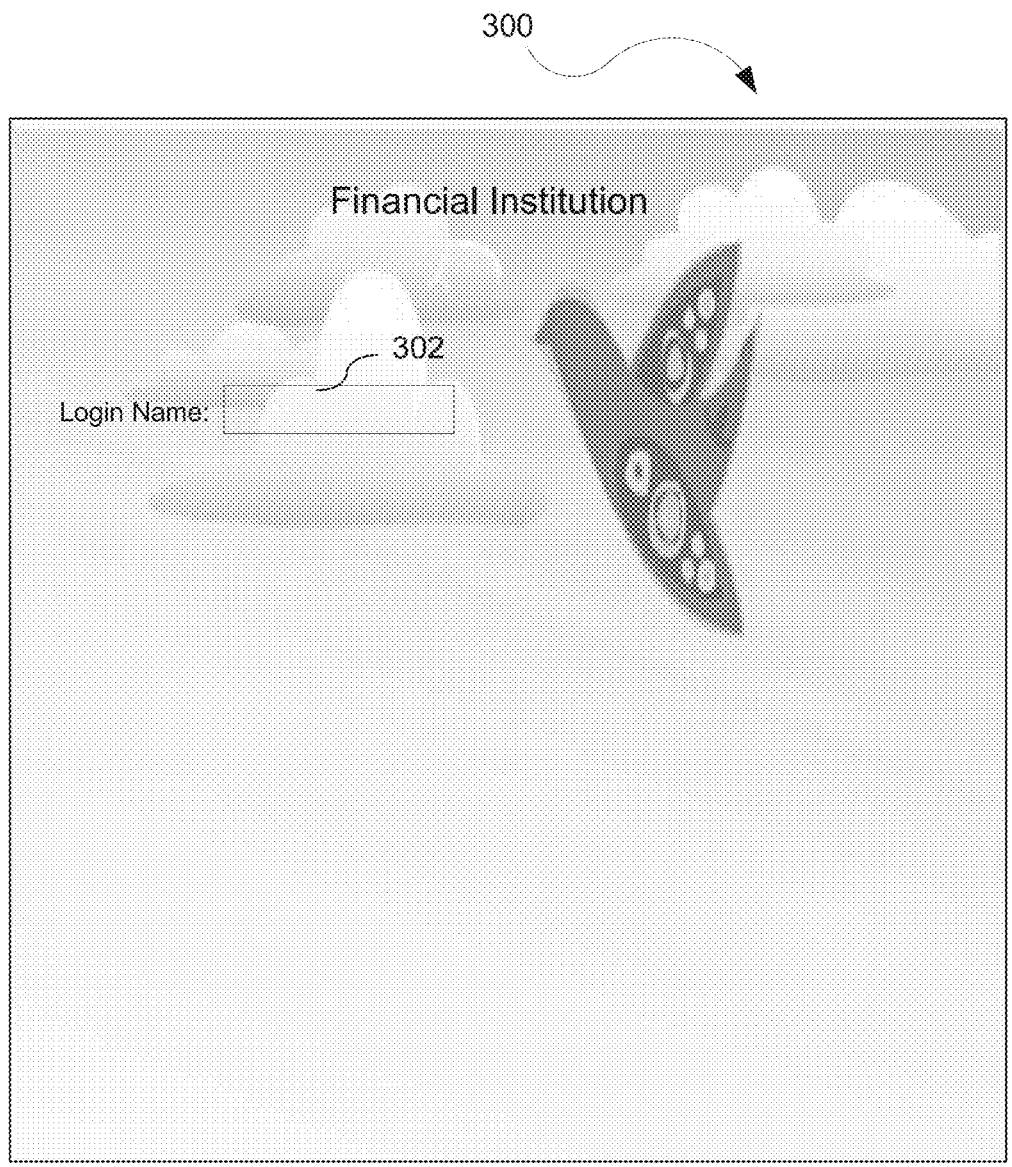
FIGS. 3A-3C illustrate examples of a website that is personalized according to the personalized theme selected in FIGS. 2A and 2B.
Figure 3B:
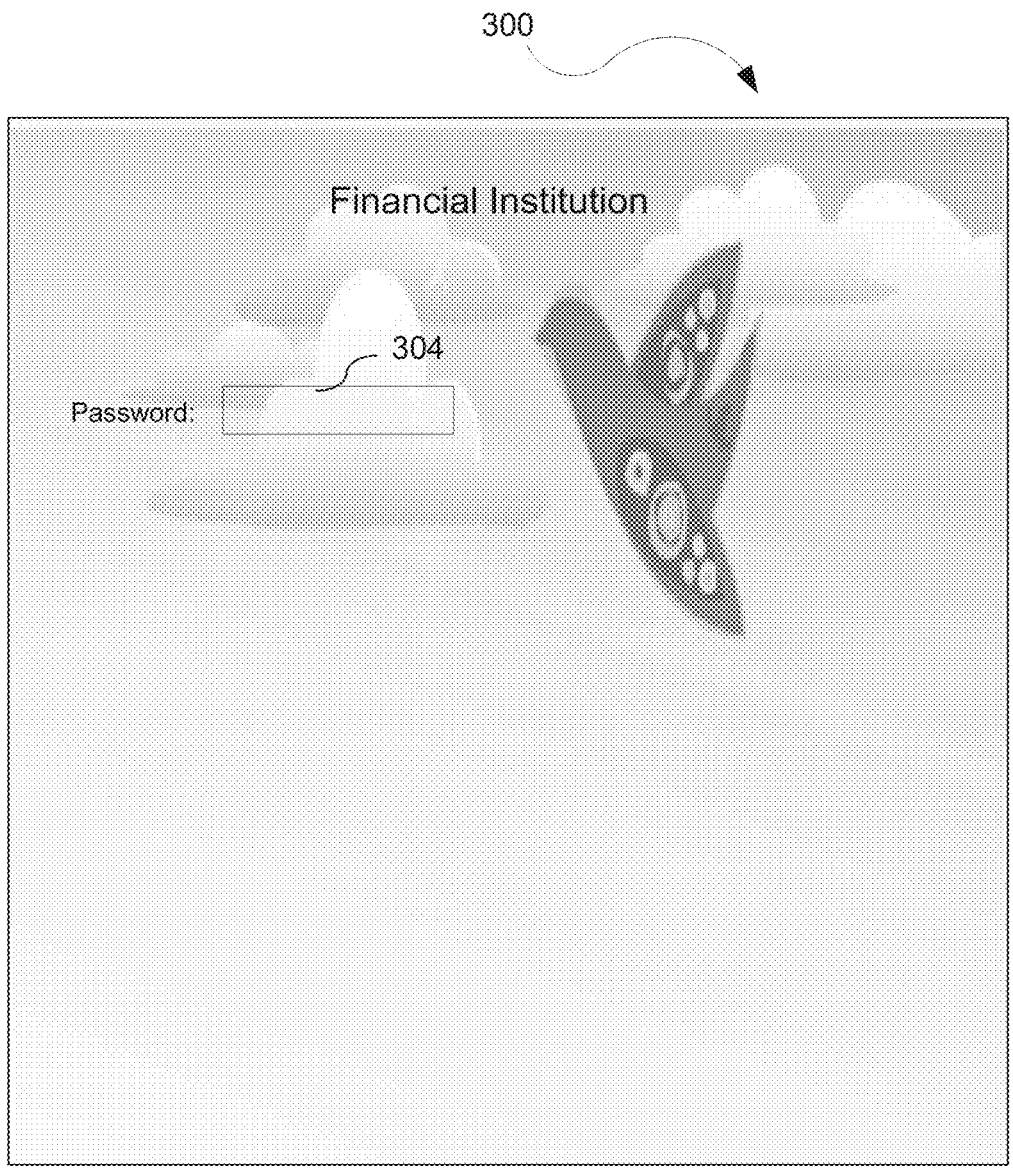
Figure 3C:
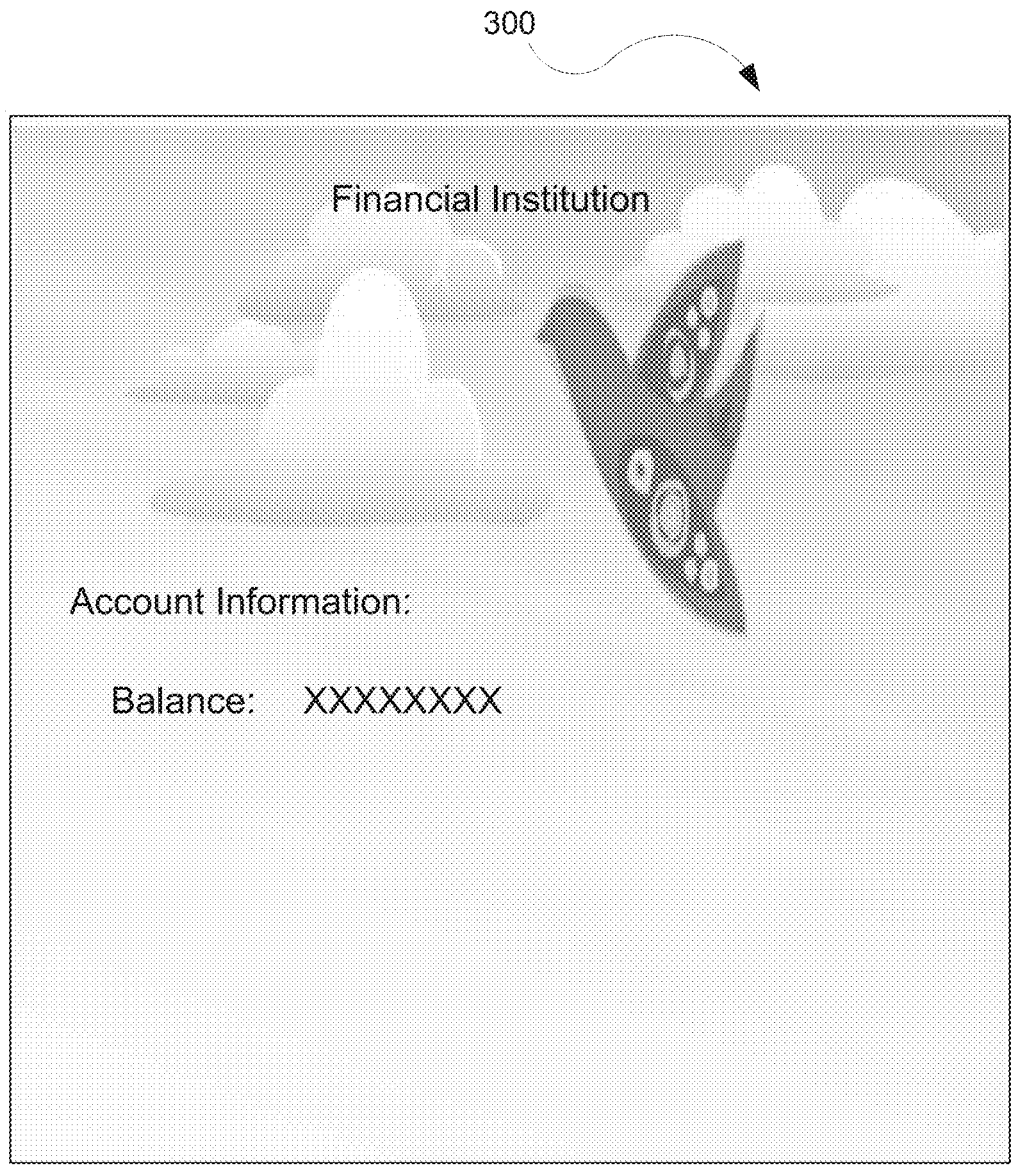

FIGS. 3A-3C illustrate examples of a website 300 that is personalized according to the personalized theme selected in FIGS. 2A and 2B. FIG. 3A illustrates the website 300 personalized according to the theme selected by the user prior to any entry of user data. For instance, the website 300 may belong to a financial institution. As the user's account information is sensitive, the website may have directed the user to the GUI 200 prior to access of the website 300 to establish a personalized theme. The personalized theme selected by the user is displayed by the set of code when the user enters the web address of the website in a web browser. Accordingly, the website 300 is personalized according to the image selected by the user prior any input of user information. For example, the image selected by the user is displayed prior to the user entering his or her login name. As the user views the personalized theme that he or she is familiar with, the user should feel comfortable providing his or her login name in a login name field 302.

Further, FIG. 3B illustrates the website 300 personalized according to the selected by the user after entering his or her login name in FIG. 3A, but prior to the entry of a password. As the user views the personalized theme that he or she is familiar with, the user should feel comfortable providing his or her password in a password field 304. Although FIG. 3B is illustrates the password field 304 being displayed on a separate webpage from the login name field 302, an alternative configuration provides for both the login name field 302 and the password field 304 being displayed on the same webpage.

In addition, FIG. 3C illustrates the website 300 providing a display of user data after access has been granted. As an example, the website 300 may provide account information such as an account balance. As this example is provided for ease of illustration, various other types of user data, account information, services, or the like may be displayed.

FIGS. 3A-3C illustrated the personalized theme being displayed throughout the entire interaction between the user and the website 300. However, an alternative configuration allows for the personalized theme to be displayed for only part of the interaction between the user and the website 300. For example, the personalized theme may be displayed on at least one webpage requesting login data from the user, e.g., login name and/or password, but may not be displayed on the webpages after access is granted since the user has completed the login process. Further, as another alternative configuration, the personalized theme may be displayed on at least one webpage that is part of the login process. For example, the personalized theme may be displayed on the webpage having the login name field 302, but not the password field 304 as the website has already been recognized by the user. As yet another alternative, the personalized theme may not be displayed on the webpage having the login name field 302 or the webpage having account information, but may be displayed on the webpage having the password field 304. A variety of configurations may be utilized in which a portion of webpages of a website display the personalized theme.

Figure 4A:
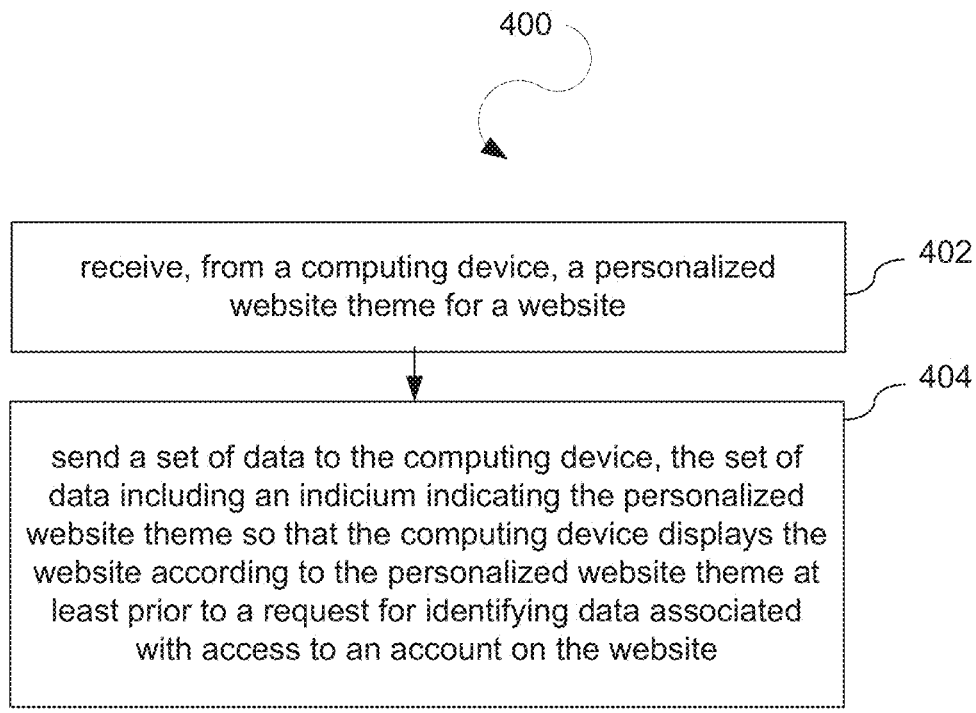
FIGS. 4A-4F illustrates various processes that may be utilized for a personalized website theme.
Figure 4B:
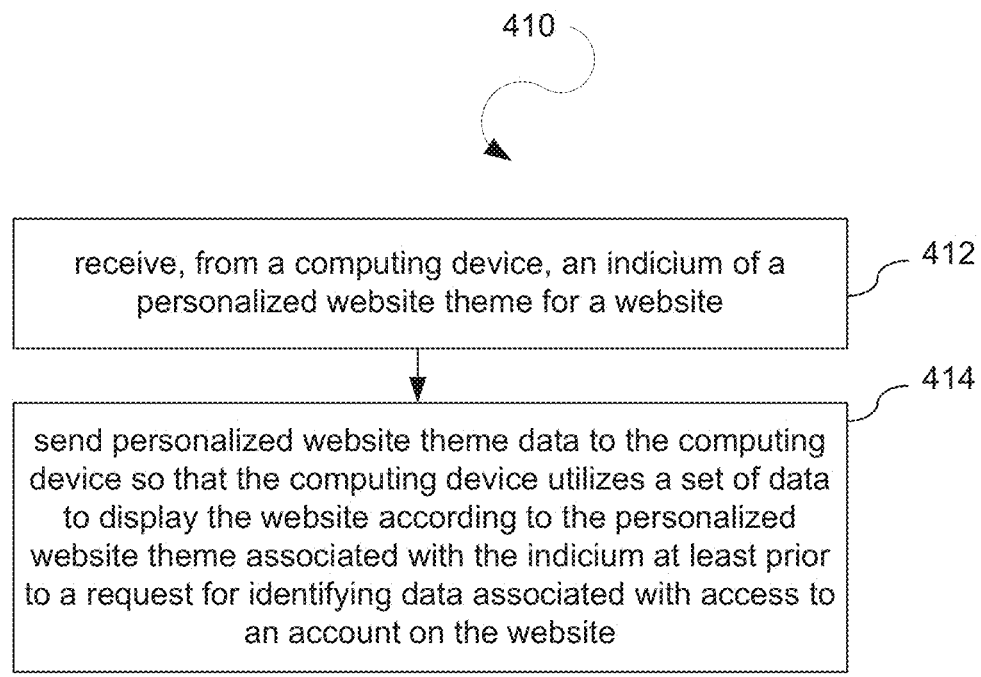
Figure 4C:
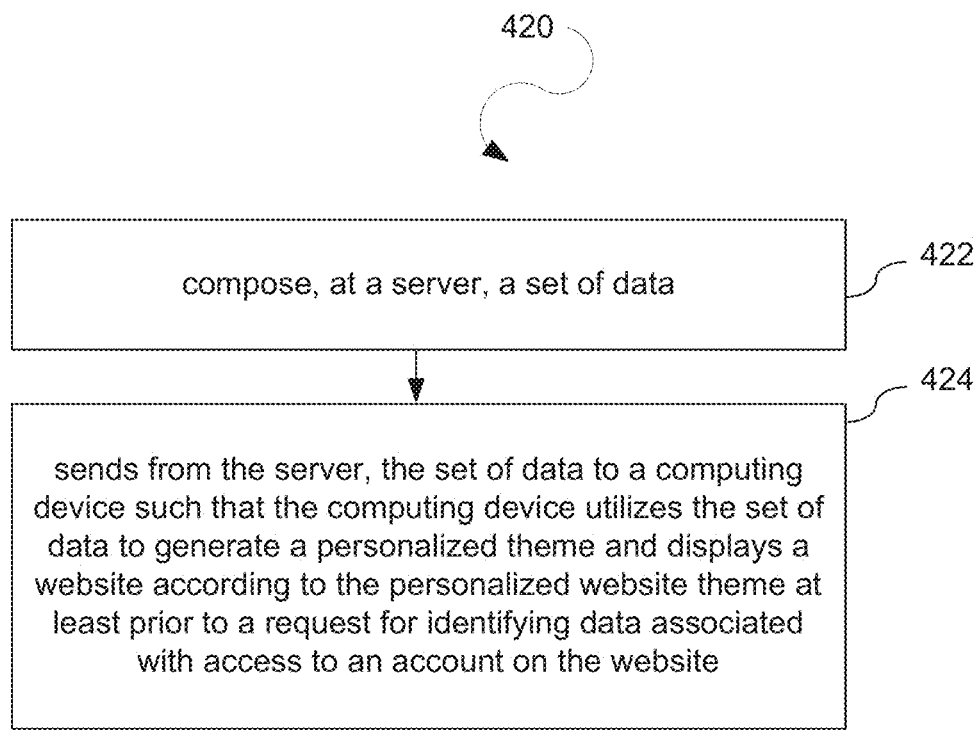

FIGS. 4A-4C illustrates various processes that may be utilized for a personalized website theme. FIG. 4A illustrates a process 400 that may be utilized to provide a personalized theme. At a process block 402, the process 400 receives, from a computing device, a personalized website theme for a website, the personalized website theme being distinct from a standard theme of the website. Further, at a process block 404, the process sends a set of data to the computing device. The set of data includes an indicium indicating the personalized website theme so that the computing device displays the website according to the personalized website theme at least prior to a request for identifying data associated with access to an account on the website.

Further, FIG. 4B illustrates another process 410 that may be utilized to provide a personalized theme. At a process block 412, the process 410 receives, from a computing device, an indicium of a personalized website theme for a website. The personalized website theme is distinct from a standard theme of the website. Further, at a process block 414, the process 400 sends a set of data to the computing device so that the computing device utilizes a set of data to display the website according to the personalized website theme associated with the indicium at least prior to a request for identifying data associated with access to an account on the website.

In addition, FIG. 4C illustrates yet another process 420 that may be utilized to provide a personalized theme. At a process block 422, the process 420 composes, at a server, a set of data. Further, at a process block 424, the process 420 sends, from the server, the set of data to a computing device such that the computing device utilizes the set of data to generate a personalized theme and displays a website according to the personalized website theme at least prior to a request for identifying data associated with access to an account on the website.

Figure 4D:
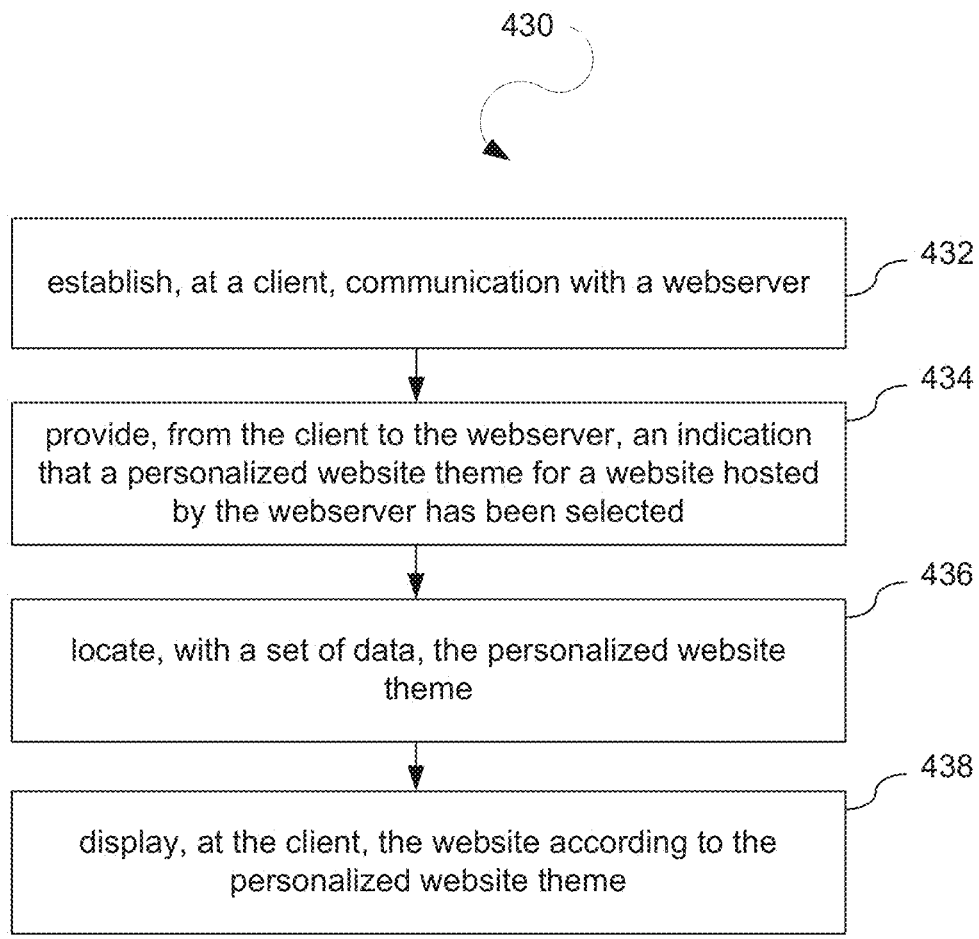

Further, FIG. 4D illustrates another process 430 that may be utilized to provide a personalized theme. At a process block 432, the process 430 establishes, at a client, communication with a webserver. Further, at a process block 434, the process 430 provides, from the client to the webserver, an indication that a personalized website theme for a website hosted by the webserver has been selected. In addition, at a process block 436, the process 430 locates, with a set of data, the personalized website theme. At a process block 438, the process 430 displays, at the client, the website according to the personalized website theme.

Figure 4E:
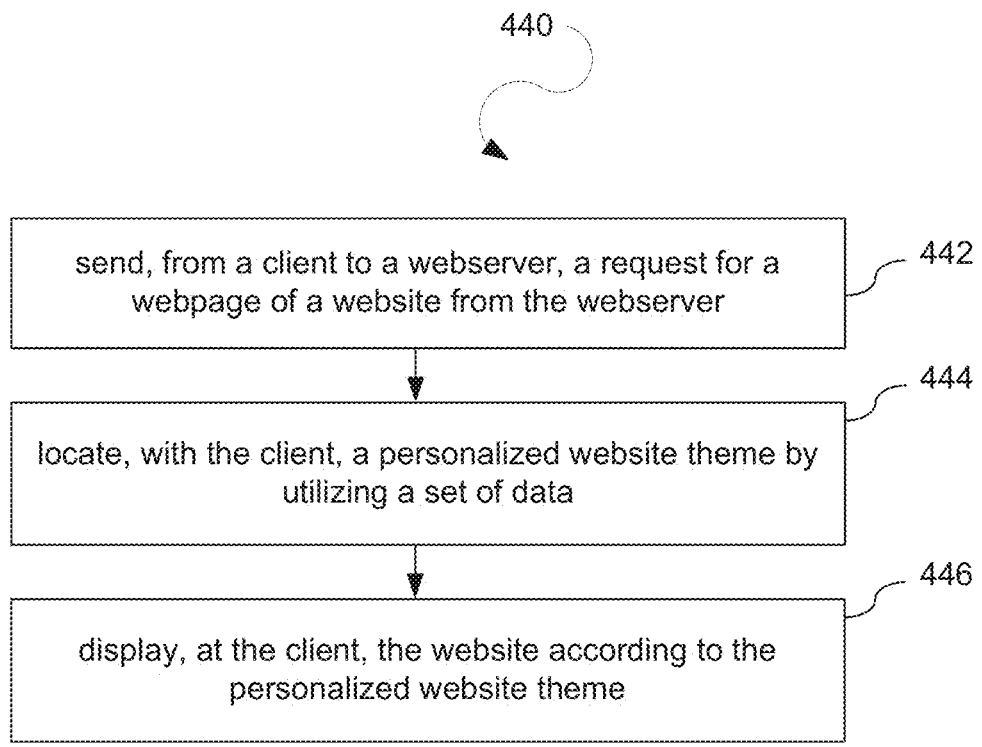

In addition, FIG. 4E illustrates another process 440 that may be utilized to provide a personalized theme. At a process block 442, the process 440 sends, from a client to a webserver, a request for a webpage of a website from the webserver. Further, at a process block 444, the process 400 locates, with the client, a personalized website theme by utilizing a set of data. In addition, at a process block 446, the process 440 displays, at the client, the website according to the personalized website theme.

Figure 4F:
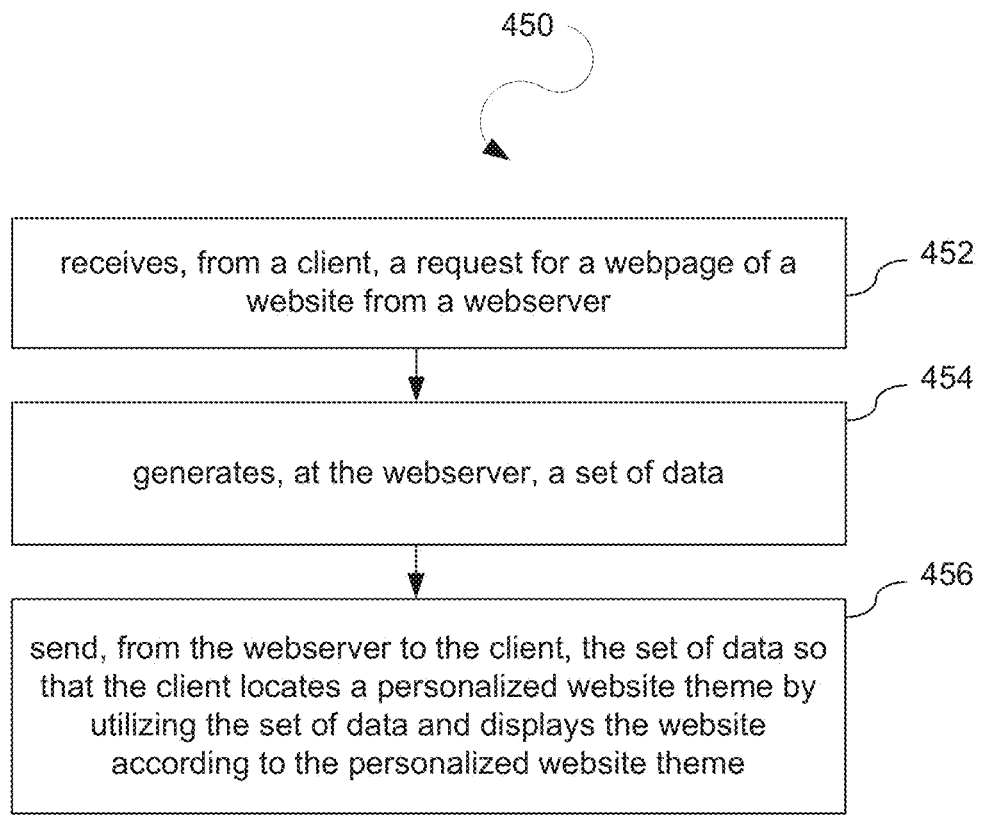

FIG. 4F illustrates another process 450 that may be utilized to provide a personalized theme. At a process block 452, the process 450 receives, from a client, a request for a webpage of a website from the webserver. Further, at a process block 454, the process 450 generates, at the webserver, a set of data. In addition, at a process block 456, the process 450 sends, from the webserver to the client, the set of data so that the client locates a personalized website theme by utilizing the set of data and displays the website according to the personalized website theme.

In an alternative embodiment, a computing device may receive an indicium of a personalized website theme, e.g., an input that indicates a selection, for a website. Further, a server may send the personalized website theme data to the computing device so that the computing device displays the website according to the personalized website theme associated with the indicium at least prior to a request for identifying data associated with access to an account on the website. In other words, the server may send the data for the theme selected by the user so that the computing device may generate the personalized theme for the website.

In yet another alternative embodiment, a set of code may be composed. The set of code may be sent from a server to a computing device such that the computing device generates a personalized theme and displays a website according to the personalized website theme at least prior to a request for identifying data associated with access to an account on the website. In other words, the server may be completely unaware of the personalized theme selected by the user. The computing device may perform the personalized theme selection process and store the personalized them on the computing device or in a data storage associated therewith. When the user attempts to a view the website, the computing device may utilize the set of code to display the website according to the personalized website theme.

Figure 5:
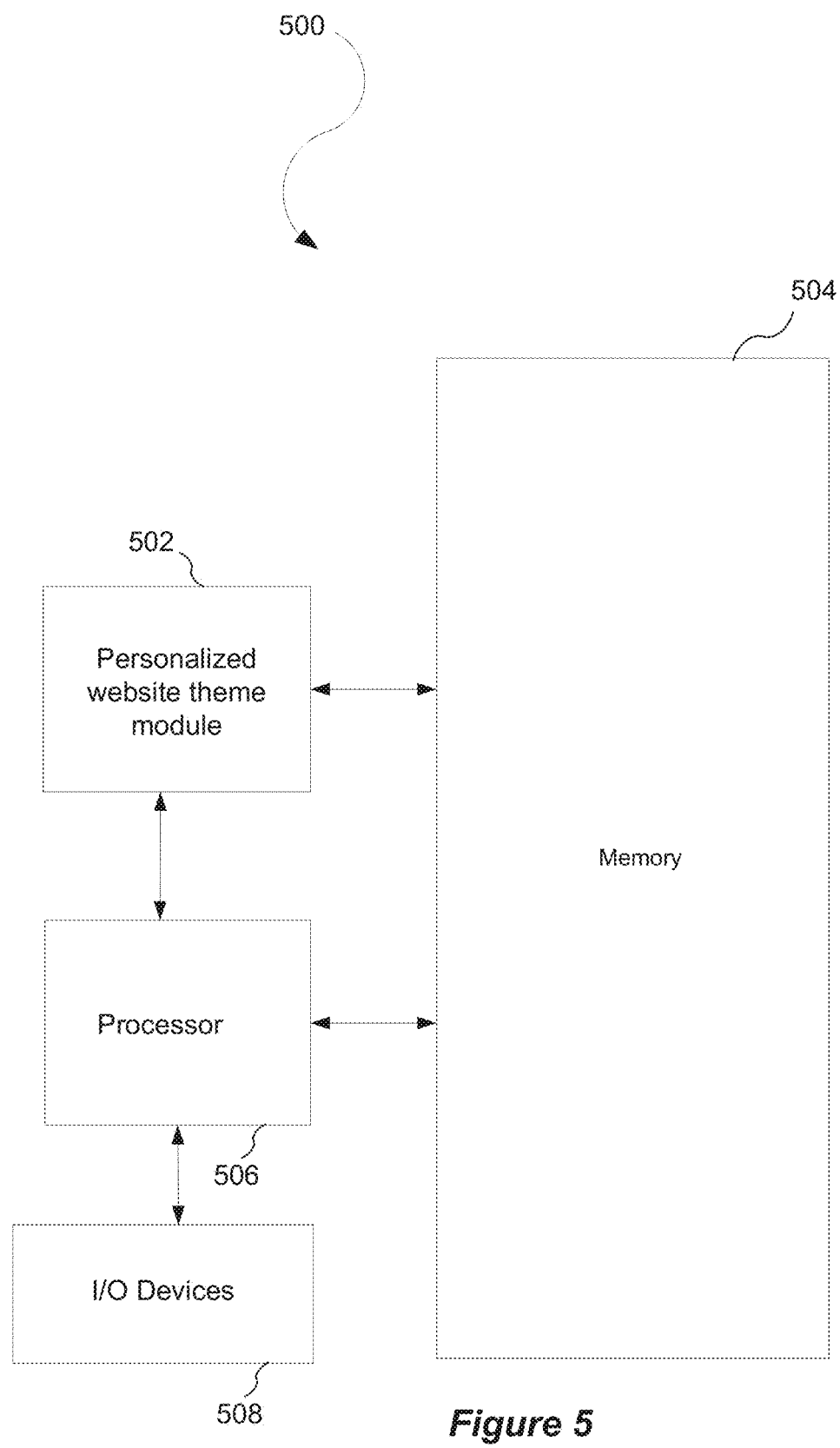
FIG. 5 illustrates a system configuration that may be utilized to personalize a website theme.

FIG. 5 illustrates a system configuration 500 that may be utilized to personalize a website theme. In one embodiment, a personalized website theme module 502 interacts with a memory 504 and a processor 506. In one embodiment, the system configuration 500 is suitable for storing and/or executing program code and is implemented using a general purpose computer or any other hardware equivalents. The processor 506 is coupled, either directly or indirectly, to the memory 504 through a system bus. The memory 504 can include local memory employed during actual execution of the program code, bulk storage, and/or cache memories which provide temporary storage of at least some program code in order to reduce the number of times code must be retrieved from bulk storage during execution.

The Input/Output ("I/O") devices 508 can be coupled directly to the system configuration 500 or through intervening input/output controllers. Further, the I/O devices 508 may include a keyboard, a keypad, a mouse, a microphone for capturing speech commands, a pointing device, and other user input devices that will be recognized by one of ordinary skill in the art. Further, the I/O devices 508 may include output devices such as a printer, display screen, or the like. Further, the I/O devices 508 may include a receiver, transmitter, speaker, display, image capture sensor, biometric sensor, etc. In addition, the I/O devices 508 may include storage devices such as a tape drive, floppy drive, hard disk drive, compact disk ("CD") drive, etc. Any of the modules described herein may be single monolithic modules or modules with functionality distributed in a cloud computing infrastructure utilizing parallel and/or pipeline processing.

Network adapters may also be coupled to the system configuration 500 to enable the system configuration 500 to become coupled to other systems, remote printers, or storage devices through intervening private or public networks. Modems, cable modems, and Ethernet cards are just a few of the currently available types of network adapters.

The processes described herein may be implemented in a general, multi-purpose or single purpose processor. Such a processor will execute instructions, either at the assembly, compiled or machine-level, to perform the processes. Those instructions can be written by one of ordinary skill in the art following the description of the figures corresponding to the processes and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized data through wireline or wireless transmissions locally or remotely through a network. A computer is herein intended to include any device that has a general, multi-purpose or single purpose processor as described above.

It should be understood that the processes and systems described herein can take the form of entirely hardware embodiments, entirely software embodiments, or embodiments containing both hardware and software elements. If software is utilized to implement the method or system, the software can include but is not limited to firmware, resident software, microcode, etc.

It is understood that the computer program products, processes, and systems described herein may also be applied in other types of processes and systems. Those skilled in the art will appreciate that the various adaptations and modifications of the embodiments of the computer program products, processes, and systems described herein may be configured without departing from the scope and spirit of the present computer program products, processes, and systems. Therefore, it is to be understood that, within the scope of the appended claims, the present computer program products, processes, and systems may be practiced other than as specifically described herein.

I claim:

1. A method comprising:
   receiving, at a processor of a computing device and from a webserver, a website;
   displaying, at the computing device by the processor, a personalized website theme of the website, the personalized website theme including at least an image, the personalized website theme different than a publicly-viewable standard theme of the website, the website containing a prompt for identifying data;

receiving, at the computing device by the processor, the identifying data via the prompt after the displaying of the personalized website theme;

sending, from the processor of the computing device and to the webserver, a request for access to a restricted access part of the website, the request including the identifying data;

receiving, at the processor of the computing device and from the webserver, the restricted access part of the website; and displaying, at the computing device by the processor, the restricted access part of the website.

2. A method as described in claim 1, wherein displaying the personalized website theme is responsive to receiving, at the computing device, a login name and determining that the login name is associated with the personalized website theme.

3. A method as described in claim 1, wherein the identifying data comprises at least a login name and a password.

4. A method as described in 1, wherein the personalized website theme of the website is not received from the webserver.

5. A method as described in claim 4, wherein the personalized website theme is stored locally on the computing device.

6. A method as described in claim 4, wherein the personalized website theme is received by the computing device from a database other than the webserver.

7. A method as described in claim 1, wherein the personalized website theme is received from the webserver.

8. A method as described in claim 1, wherein displaying the restricted access part of the website displays the restricted access part of the website within the personalized website theme.

9. A method as described in claim 1, wherein displaying the restricted access part of the website displays the restricted access part of the website without the personalized website theme.

10. A method comprising:
receiving, at a processor of a webserver and from a computing device, a request for a website;

sending, from the processor of the webserver to the computing device, the requested website, the requested website containing a prompt for identifying data and having a personalized website theme different than a publicly-viewable standard theme of the website, the personalized website theme including at least an image associated with the personalized website theme and not with the publicly-viewable website theme, the personalized website theme is stored locally on the computing device;

receiving, at the processor of the webserver and from the computing device, a request for access to a restricted access part of the requested website, the request including identifying data; and granting, to the computing device, by the processor of the webserver, and responsive to receiving the identifying data, access to the restricted access part of the requested website.

11. A method as described in claim 10, wherein the identifying data comprises at least a login name and a password.

12. A method as described in claim 10, wherein the personalized website theme is received by the webserver from a database prior to sending the requested website.

13. A method comprising:
receiving, at a computing device and from a webserver, a website including a graphical user interface configured to receive a personalized website theme selection;

displaying the graphical user interface at the computing device, the graphical user interface containing selectable representations of a plurality of personalized website themes, the personalized website themes being different than a publicly-viewable standard theme of the website, and each personalized website theme of the plurality of personalized website themes including at least an image associated with the personalized website theme and not with the publicly-viewable website theme;

receiving, at the computing device, a selection selecting a personalized website theme of the plurality of personalized website themes; and displaying, in the graphical user interface, the selected personalized website theme.

14. A method as described in claim 13, further comprising receiving, at the computing device and from a source other than the) webserver, an uploaded personalized website theme, the uploaded personalized website theme one of the plurality of personalized website themes.

15. A method as described in claim 13, wherein the image included in the personalized website them is a background image or a foreground image.

16. A method as described in claim 13, wherein the personalized website theme further includes a sound, a color scheme, or a particular style in a cascading style sheet.

17. A method as described in claim 13, wherein the plurality of personalized website themes are received with the website from the webserver.

18. A method as described in claim 13, wherein the plurality of personalized website themes are received from a database other than the web server.

19. A method as described in claim 13, further comprising storing the selected personalized website theme locally on the computing device.

* * * * *

UNITED STATES PATENT AND TRADEMARK OFFICE
CERTIFICATE OF CORRECTION

PATENT NO. : 9,659,180 B2  
APPLICATION NO. : 13/253010  
DATED : May 23, 2017  
INVENTOR(S) : William Shapiro Page 1 of 1

It is certified that error appears in the above-identified patent and that said Letters Patent is hereby corrected as shown below:

In the Claims

Column 10, Line 36, after "than the" delete ")", therefor.

Column 10, Line 50, delete "web server", insert -- webserver --, therefor.

Signed and Sealed this
First Day of August, 2017

Joseph Matal
*Performing the Functions and Duties of the*
*Under Secretary of Commerce for Intellectual Property and*
*Director of the United States Patent and Trademark Office*